US012552958B2

(12) United States Patent
Greszta-Franz et al.

(10) Patent No.: US 12,552,958 B2
(45) Date of Patent: *Feb. 17, 2026

(54) TWO-COMPONENT OUTER COATING CONTAINING POLYASPARTIC ACID ESTERS

(71) Applicant: Covestro Intellectual Property GmbH & Co. KG, Leverkusen (DE)

(72) Inventors: Dorota Greszta-Franz, Solingen (DE); Jan Weikard, Leverkusen (DE); Matthias Wintermantel, Hürth (DE); Robert Reyer, Langenfeld (DE); Thomas Schuettler, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 984 days.

This patent is subject to a terminal disclaimer.

(21) Appl. No.: 17/430,746

(22) PCT Filed: Feb. 20, 2020

(86) PCT No.: PCT/EP2020/054419
§ 371 (c)(1),
(2) Date: Aug. 13, 2021

(87) PCT Pub. No.: WO2020/169701
PCT Pub. Date: Aug. 27, 2020

(65) Prior Publication Data
US 2022/0145121 A1    May 12, 2022

(30) Foreign Application Priority Data

Feb. 22, 2019 (EP) .................... 19158883

(51) Int. Cl.
C08G 18/12      (2006.01)
C08G 18/32      (2006.01)
C08G 18/38      (2006.01)
C08G 18/72      (2006.01)
C08G 18/73      (2006.01)
C08G 18/75      (2006.01)
C08K 3/22       (2006.01)
C09D 5/08       (2006.01)
C09D 175/04     (2006.01)

(52) U.S. Cl.
CPC .......... *C09D 175/04* (2013.01); *C08G 18/12* (2013.01); *C08G 18/3234* (2013.01); *C08G 18/3821* (2013.01); *C08G 18/722* (2013.01); *C08G 18/73* (2013.01); *C08G 18/755* (2013.01); *C08K 3/22* (2013.01); *C09D 5/08* (2013.01); *C08G 2150/00* (2013.01); *C08K 2003/2241* (2013.01); *C08K 2003/2251* (2013.01); *C08K 2003/2265* (2013.01)

(58) Field of Classification Search
CPC .. C08G 18/12; C08G 2150/00; C08G 18/755; C09D 5/08; C09D 175/00; C08K 2003/2241
See application file for complete search history.

(56) References Cited

U.S. PATENT DOCUMENTS

| 4,853,146 | A  | 8/1989  | Roerig et al.       |
|-----------|----|---------|---------------------|
| 5,041,239 | A  | 8/1991  | Roerig et al.       |
| 5,126,170 | A  | 6/1992  | Zwiener et al.      |
| 5,214,086 | A  | 5/1993  | Mormile et al.      |
| 5,243,012 | A  | 9/1993  | Wicks et al.        |
| 5,364,955 | A  | 11/1994 | Zwiener et al.      |
| 5,412,056 | A  | 5/1995  | Zwiener et al.      |
| 5,489,704 | A  | 2/1996  | Squiller et al.     |
| 5,559,204 | A  | 9/1996  | Squiller et al.     |
| 5,623,045 | A  | 4/1997  | Zwiener et al.      |
| 5,821,326 | A  | 10/1998 | Kurek et al.        |
| 6,403,699 | B1 | 6/2002  | Roeckrath et al.    |
| 6,458,293 | B1 | 10/2002 | Roesler et al.      |
| 6,559,274 | B2 | 5/2003  | Gertzmann et al.    |
| 6,590,066 | B1 | 7/2003  | Roesler             |
| 6,774,206 | B2 | 8/2004  | Danielmeier et al.  |
| 7,968,212 | B2 | 6/2011  | Senkfor et al.      |
| 10,125,290| B2 | 11/2018 | Flosbach et al.     |
| 10,385,231| B2 | 8/2019  | Enkisch-Krug et al. |
| 11,230,522| B2 | 1/2022  | Greszta-Franz et al.|

(Continued)

FOREIGN PATENT DOCUMENTS

| CA | 2048444 A1      | 2/1992  |
| DE | 19701835 A1     | 7/1998  |
| DE | 102006002153 A1 | 7/2007  |
| DE | 102012203280 A1 | 9/2013  |
| EP | 0249201 A2      | 12/1987 |
| EP | 0667362 A1      | 8/1995  |
| EP | 0893458 A1      | 1/1999  |
| WO | 9712945 A1      | 4/1997  |
| WO | 0107399 A1      | 2/2001  |
| WO | 2005058996 A1   | 6/2005  |
| WO | 2018074884 A1   | 4/2018  |

OTHER PUBLICATIONS

International Search Report, PCT/EP2020/054419, date of mailing: Apr. 3, 2020, Authorized officer: Christian Wohnhaas.

(Continued)

*Primary Examiner* — Joseph S Del Sole
*Assistant Examiner* — Huihong Qiao
(74) *Attorney, Agent, or Firm* — Donald R. Palladino; Richard P. Bender

(57) ABSTRACT

The present invention relates to two-component topcoat systems comprising polyaspartic esters that contain only small amounts of dialkyl fumarates, to a process for the production thereof and for the use thereof in the production of coatings, in particular for corrosion protection, and to the use in the field of general industrial painting or in the field of ACE (agriculture, construction and earth-moving equipment) and to substrates coated therewith.

12 Claims, No Drawings

(56) References Cited

U.S. PATENT DOCUMENTS

| | | |
|---|---|---|
| 11,279,846 B2 | 3/2022 | Weinhold et al. |
| 11,753,563 B2 | 9/2023 | Takeno |
| 2005/0059792 A1 | 3/2005 | Roesler et al. |
| 2016/0032142 A1* | 2/2016 | Huybrechts .......... C09D 175/06 |
| 2017/0058146 A1 | 3/2017 | Flosbach et al. |
| 2020/0052156 A1 | 2/2020 | Kang et al. |

OTHER PUBLICATIONS

Usp. Khim. 1969, 38, 1933.
Houben-Weyl, Meth. d. Org. Chemie vol. 11/1, 272 (1957).

* cited by examiner

TWO-COMPONENT OUTER COATING CONTAINING POLYASPARTIC ACID ESTERS

CROSS-REFERENCE TO RELATED APPLICATION

This application is a national stage application under 35 U.S.C. § 371 of PCT/EP2020/054419, filed Feb. 20, 2020, which claims the benefit of European Application No. 19158883.9, filed Feb. 22, 2019, each of which is incorporated herein by reference.

FIELD

The present invention relates to two-component topcoat systems comprising polyaspartic esters that contain only small amounts of dialkyl fumarates, to a process for the production thereof and for the use thereof in the production of coatings, in particular for corrosion protection, and to the use in the field of ACE (agriculture, construction and earth-moving equipment) and in substrates coated therewith.

BACKGROUND

Two-component (2C) coating compositions comprising, as binder, a polyisocyanate component in combination with a component that is reactive towards isocyanate groups, in particular a polyhydroxyl component, have long been known. They are suitable for the production of high-quality coatings that can be tailored to make them hard, elastic, resistant to abrasion and solvents and, above all, weather-resistant.

Within this 2C polyurethane coating technology, certain ester-containing secondary polyamines have become established in recent years, the so-called polyaspartic esters or polyaspartates that, in combination with paint polyisocyanates, are particularly suitable as binders in low-solvent or solvent-free (high-solids) coating compositions and allow rapid hardening of the coatings at low temperatures.

Alongside the abovementioned rapid curing of these coatings, the use of such polyaspartic esters in topcoats allows a reduced layer structure that is very attractive for use in the field of topcoats. However, in the field of corrosion protection and ACE (agriculture, construction and earth-moving equipment), the conventional polyaspartate-based topcoats have so far been unable to become established because of their loss of gloss. There has accordingly long been a desire in the market for pigmented polyaspartate-based topcoats that have improved gloss retention.

The use in 2C coating compositions of polyaspartate esters either alone or in a mixture with further components that are reactive towards isocyanate groups is described for example in EP0403921, EP0639628, EP0667362, EP0689881, U.S. Pat. No. 5,214,086, EP0699696, EP0596360, EP0893458, DE19701835, EP0470461, WO15130501, WO15130502 and U.S. Pat. No. 5,243,012.

The preparation of amino-functional aspartic esters is known per se. The synthesis is carried out through addition of primary polyamines to an activated carbon-carbon double bond of vinylogous carbonyl compounds, as present for example in maleic or fumaric esters, which is adequately described in the literature (Houben-Weyl, Meth. d. Org. Chemie vol. 11/1, 272 (1957), Usp. Khim 1969, 38, 1933). If only one amino group of the polyamine has reacted with the double bond of the vinylogous carbonyl compounds, this reaction can result in the formation, as a side product, of a polyaspartic ester having primary amino groups. In the commercially available polyaspartic esters, maleic ester is used as the vinylogous carbonyl compound. During preparation of a polyaspartic ester based on maleic esters, a retro-Michael addition can occur as a further undesired side reaction in which elimination of the polyamine results in the formation of dialkyl fumarate as a minor component. A typical production process for a polyaspartic ester therefore requires a storage time of 4-6 weeks once most of the reactants have reacted with each other. During this time, the product undergoes so-called maturation, which is manifested by stabilization of the viscosity. Because conversion continues to increase during this time, the dialkyl fumarate content falls too. This storage over several weeks incurs significant logistics costs during production. Although the product is not shipped to the customer until the end of the storage period, it invariably still contains substantial amounts of dialkyl fumarate, which can cause severe sensitization. After maturation, the polyaspartic esters thus prepared typically still contain residual amounts of fumaric esters ranging from 3 to 20 percent by weight.

SUMMARY

The object of the present invention was to provide a polyaspartic ester-based coating composition for producing gloss-stable pigmented topcoats.

It was surprisingly found that this object may be achieved by polyaspartic ester-based coating compositions having a greatly reduced dialkyl fumarate content. The dialkyl fumarate content in the polyaspartic ester component is according to the invention from 0.01% to 1.2% by weight, preferably 0.01% to 1% by weight, more preferably 0.01% to 0.1% by weight, and may be reduced to these values by a special distillation process.

A theoretical possibility of working up polyaspartic esters by distillation is mentioned for example in EP0403921. This disclosure does not give any examples or specify a method of distillation. Moreover, there is no mention in EP0403921 of polyaspartic esters having a maximum dialkyl fumarate content of 1.2% by weight, particularly in the production of pigmented topcoats, let alone that this results in an improvement in the gloss stability of these coatings.

DE102006002153 likewise describes, in comparative example III, a polyaspartic ester that is freed from dialkyl fumarate by distillation. Here too, there is no mention or suggestion of the use of polyaspartic esters having a dialkyl fumarate content that is reduced in accordance with the invention in the production of pigmented topcoats or of the effect achievable thereby.

WO2018/074884 and WO2018/074885, which had not yet been published as a patent at the time of the patent application for the present invention, likewise describe the distillation of polyaspartic esters, with WO2018074884 also describing the use thereof in coating compositions. Neither of the two documents describes pigmented topcoats based on these purified esters.

The present invention relates to two-component coating compositions (2C coating compositions) comprising
  a) at least one polyaspartic ester-containing component A,
  b) at least one polyisocyanate component B,
  c) optionally one or more components C that are different from A and are reactive towards isocyanate groups,
  d) at least one inorganic and/or organic pigment, preferably in a proportion of at least 3% by weight (≥3% by weight) based on the total weight of the two-component composition (component D1) and optionally other auxiliaries and additives (component D2).

In the context of the present invention, polyaspartic ester-containing components A are compositions comprising one or more polyaspartic esters of the general formula (I)

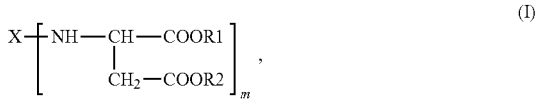

in which
X is an m-valent organic radical, optionally containing one or more heteroatoms, as can be obtained by removing the primary amino groups from a corresponding polyamine that has (cyclo)aliphatically or araliphatically attached amino groups and is in the molecular weight range from 60 to 6000 g/mol, and which may contain further functional groups that are reactive towards isocyanate groups and/or inert at temperatures of up to 100° C., R1 and R2 are identical or different organic radicals each having 1 to 18 carbon atoms, m is an integer>1, and optionally one or more polyaspartic esters having a primary amino group that are of the general formula (II)

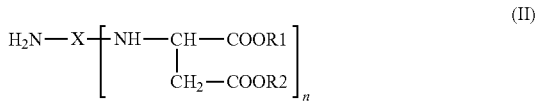

in which
n is m−1,

X and radicals R1 and R2 have the meanings defined above, characterized in that dialkyl fumarates are present in component A in an amount from 0.01% to 1.2% by weight (≥0.01% to ≤1.2% by weight) based on the total weight of component A.

DETAILED DESCRIPTION

Polyaspartic ester-containing components A are preferably compositions comprising one or more polyaspartic esters of the general formulas (I) and optionally (II) in which R1 and R2 are identical or different alkyl radicals each having 1 to 18 carbon atoms, preferably identical or different alkyl radicals each having 1 to 8 carbon atoms, and most preferably in each case alkyl radicals such as methyl, ethyl, propyl, isopropyl, butyl or isobutyl radicals. Most preferred is ethyl.

Polyaspartic ester-containing components A are compositions comprising one or more polyaspartic esters of the general formulas (I) and optionally (II), in which X is organic radicals obtained by removing the primary amino groups from a corresponding (cyclo)aliphatically or araliphatically attached polyamine having primary amino groups, selected from the following group: all known polyamines having primary amino groups that conform to the general formula (III). Examples include the following compounds: ethylenediamine, 1,2-diaminopropane, 1,4-diaminobutane, 1,5-diaminopentane, 2,5-diamino-2,5-dimethylhexane, 1,5-diamino-2-methylpentane (Dytek®A, from Invista), 1,6-diaminohexane, 2,2,4- and/or 2,4,4-trimethyl-1,6-diaminohexane, 1,11-diaminoundecane, 1,12-diaminododecane or triaminononane, etheramines such as 4,9-dioxadodecane-1,12-diamine, 4,7,10-trioxatridecane-1,13-diamine or higher-molecular-weight polyether polyamines having aliphatically attached primary amino groups, for example those marketed under the Jeffamine® name by Huntsman. Also employable are aliphatic polycyclic polyamines such as tricyclodecanebismethylamine (TCD diamine) or bis(aminomethyl)norbornanes, aminofunctional siloxanes, for example diaminopropylsiloxane G10 DAS (from Momentive), oleoalkyl-based amines, for example Fentamine from Solvay, dimeric fatty acid diamines such as Priamine from Croda.

Polyaspartic ester-containing components A are preferably compositions comprising one or more polyaspartic esters of the general formulas (I) and optionally (II), in which X is organic radicals obtained by removing the primary amino groups from one of the polyamines of the general formula (III) in which m=2 and X is a cyclic hydrocarbon radical containing at least one cyclic carbon ring. Examples of diamines that may be used with particular preference are 1-amino-3,3,5-trimethyl-5-aminomethylcyclohexane (IPDA), 2,4- and/or 2,6-hexahydrotolylenediamine (H6-TDA), isopropyl-2,4-diaminocyclohexane and/or isopropyl-2,6-diaminocyclohexane, 1,3-bis(aminomethyl)cyclohexane, 2,4'-, and/or 4,4'-diaminodicyclohexylmethane, 3,3'-dimethyl-4,4'-diaminodicyclohexylmethane (Laromin® C 260, BASF AG), the isomeric diaminodicyclohexylmethanes substituted in the ring with a methyl group (=C-monomethyl-diaminodicyclohexylmethanes), 3(4)-aminomethyl-1-methylcyclohexylamine (AMCA) and also araliphatic diamines such as 1,3-bis(aminomethyl)benzene or m-xylylenediamine.

Polyaspartic ester-containing components A are likewise preferably compositions comprising one or more polyaspartic esters of the general formulas (I) and optionally (II), in which X is organic radicals obtained by removing the primary amino groups from one of the polyamines of the general formula (III), selected from the group: polyether polyamines having aliphatically attached primary amino groups, 1,2-diaminopropane, 1,4-diaminobutane, 1,6-diaminohexane, 1,5-diamino-2-methylpentane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 1,5-diaminopentane, 2,4'- and/or 4,4'-diaminodicyclohexylmethane or 3,3'-dimethyl-4,4'-diaminodicyclohexylmethane. Particular preference is given to 3,3'-dimethyl-4,4'-diaminodicyclohexylmethane, 1,5-diaminopentane, 2,4'- and/or 4,4'-diaminodicyclohexylmethane, 1,5-diamino-2-methylpentane, and very particular preference to using 2,4'- and/or 4,4'-diaminodicyclohexylmethane.

Polyaspartic ester-containing components A are particularly preferably compositions comprising one or more polyaspartic esters of the general formulas (I) and optionally (II), in which X is organic radicals obtained by removing the primary amino groups from one of the polyamines of the general formula (III), selected from the group: polyether polyamines having aliphatically attached primary amino groups, 1,2-diaminopropane, 1,4-diaminobutane, 1,5-diaminopentane, 1,6-diaminohexane, 1,5-diamino-2-methylpentane, 2,5-diamino-2,5-dimethylhexane, 2,2,4- and/or 2,4, 4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 2,4'- and/or 4,4'-diaminodicyclohexylmethane or 3,3'-dimethyl-4,4'-diaminodicyclohexylmethane.

Polyaspartic ester-containing components A are most preferably compositions comprising one or more polyaspartic esters of the general formulas (I) and optionally (II), in which X is organic radicals obtained by removing the primary amino groups from one of the polyamines of the general formula (III), selected from the group: 3,3'-dimethyl-4,4'-diaminodicyclohexylmethane, 2,4'- and/or 4,4'-diaminodicyclohexylmethane, 1,5-diamino-2-methylpentane.

Index m is an integer>1 and preferably 2.

Where the polyaspartic ester-containing component A comprises one or more polyaspartic esters of the general formula (II), these are present in a proportion of >0%, preferably not less than 0.1% (≥0.1%), more preferably not less than 1% (≥1%), most preferably not less than 4% (≥4%), and preferably not more than 20% (≤20%), more preferably not more than 15% (≤15%), of the area by GC (measured as area % in the gas chromatogram), wherein the sum of the areas by GC of compounds of the two general formulas (I) and (II) is 100%. Any combination of the specified upper and lower limits is possible. All possible combinations are considered disclosed.

Polyaspartic ester-containing components A are preferably compositions comprising one or more polyaspartic esters of the general formulas (I) and optionally (II) in which the proportion of dialkyl fumarates is 0.01% to 1.2% by weight (≥0.01% to ≤1.2% by weight), preferably 0.01% to 1% by weight (≥0.01% to ≤1% by weight), more preferably 0.01% to 0.1% by weight (≥0.01% to ≤0.1% by weight), based on the total weight of component A.

Polyaspartic ester-containing components A are particularly preferably compositions comprising one or more polyaspartic esters of the general formula (I),
in which
X is an m-valent organic radical optionally containing one or more heteroatoms, as obtained by removing primary amino groups from polyether polyamines having aliphatically attached primary amino groups, 1,2-diaminopropane, 1,4-diaminobutane, 1,5-diaminopentane, 1,6-diaminohexane, 1,5-diamino-2-methylpentane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 2,4'- and/or 4,4'-diaminodicyclohexylmethane or 3,3'-dimethyl-4,4'-diaminodicyclohexylmethane,
R1 and R2 are identical or different alkyl radicals each having 1 to 8 carbon atoms,
m is an integer>1,
and
one or more polyaspartic esters having a primary amino group that are of the general formula (II),
in which
n is m−1,
X and radicals R1 and R2 have the meanings defined above,
characterized in that the proportion of compounds of the general formula (II) corresponds to >0%, preferably not less than 0.1% (≥0.1%), more preferably not less than 1% (≥1%), most preferably not less than 4% (≥4%) of the area by GC (measured as area % in the gas chromatogram), wherein the sum of the areas by GC of compounds of the two general formulas (I) and (II) is 100% and dialkyl fumarates are present in component A in an amount from 0.01% to 1.2% by weight (≥0.01% to ≤1.2% by weight) based on the total weight of component A.

An alternative particularly preferred embodiment corresponds to the one described above, but with there being no polyaspartic ester having a primary amino group that are of the general formula (II) present in the polyaspartic ester-containing components A.

Polyaspartic ester-containing components A are most preferably compositions comprising one or more polyaspartic esters of the general formula (I)
in which
X is an m-valent organic radical as can be obtained by removing primary amino groups from 3,3'-dimethyl-4,4'-diaminodicyclohexylmethane, 2,4'- and/or 4,4'-diaminodicyclohexylmethane, 1,5-diamino-2-methylpentane,
R1 and R2 are identical or different alkyl radicals selected from the group consisting of methyl, ethyl, propyl, isopropyl, butyl or isobutyl radicals,
m is 2,
and
one or more polyaspartic esters having a primary amino group that are of the general formula (II),
in which
n is m−1,
X and radicals R1 and R2 have the meanings defined above,
characterized in that the proportion of compounds of the general formula (II) corresponds to >0%, preferably not less than 0.1% (≥0.1%), more preferably not less than 1% (≥1%), most preferably not less than 4% (≥4%) of the area by GC (measured as area % in the gas chromatogram), wherein the sum of the areas by GC of compounds of the two general formulas (I) and (II) is 100% and dialkyl fumarates are present in component A in an amount from 0.01% to 1% by weight (≥0.01% to ≤1% by weight) based on the total weight of component A.

An alternative very particularly preferred embodiment corresponds to the one described above, but with there being no polyaspartic ester having a primary amino group that are of the general formula (II) present in the polyaspartic ester-containing components A.

Polyaspartic ester-containing components A are most preferably compositions comprising one or more polyaspartic esters of the general formula (I),
in which
X is an m-valent organic radical as can be obtained by removing primary amino groups from 3,3'-dimethyl-4,4'-diaminodicyclohexylmethane, 2,4'- and/or 4,4'-diaminodicyclohexylmethane,
R1 and R2 are ethyl radicals,
m is 2,
and
one or more polyaspartic esters having a primary amino group that are of the general formula (II),
in which
n is m−1,
X and radicals R1 and R2 have the meanings defined above,
characterized in that the proportion of compounds of the general formula (II) corresponds to >0%, preferably not less than 0.1% (≥0.1%), more preferably not less than 1% (≥1%), most preferably not less than 4% (≥4%) of the area by GC (measured as area % in the gas chromatogram), wherein the sum of the areas by GC of compounds of the two general formulas (I) and (II) is 100% and dialkyl fumarates are present in component A in an amount from 0.01% to 0.1% by weight (≥0.01% to ≤0.1% by weight) based on the total weight of component A.

An alternative most preferred embodiment corresponds to the one described above, but with there being no polyaspartic ester having a primary amino group that are of the general formula (II) present in the polyaspartic ester-containing components A.

Polyaspartic ester-containing components A are preferably compositions comprising one or more polyaspartic esters of the general formulas (I) and optionally (II) that have a platinum-cobalt colour index≤100, more preferably ≤50. The platinum-cobalt colour index is measured in accordance with DIN EN ISO 6271:2016-05.

Polyaspartic ester-containing components A comprising one or more polyaspartic esters of the general formula (I) and formula (II) can be prepared by the following process:

Reaction of polyamines of the general formula (III),

where X
is an m-valent organic radical, optionally containing one or more heteroatoms, as can be obtained by removing the primary amino groups from a polyamine that has (cyclo)aliphatically or araliphatically attached amino groups and is in the molecular weight range from 60 to 6000 g/mol, and which may contain further functional groups that are reactive towards isocyanate groups and/or inert at temperatures of up to 100° C.,
m is an integer>1, preferably 2.
with compounds of the general formula (IV)

where R1 and R2
are identical or different organic radicals, preferably identical or different alkyl radicals each having 1 to 18 carbon atoms, more preferably identical or different alkyl radicals each having 1 to 8 carbon atoms, very particularly preferably in each case alkyl radicals such as methyl, ethyl, propyl, isopropyl, butyl or isobutyl radicals and most preferably ethyl,
and removal by distillation of the unreacted fraction of the compound of the general formula (IV).

The process described above for the preparation of polyaspartic ester-containing components A comprising one or more polyaspartic esters of the general formula (I) and formula (II) is preferably carried out in two steps. In the first step, the compounds of the general formula (III) and (IV) are reacted at temperatures between 0° C. and 100° C., preferably 20 to 80° C., and more preferably 20 to 60° C., in a ratio of equivalents of primary amino groups in the compounds of the general formula (III) to C=C double bond equivalents in the compounds of the general formula (IV) of 1:1.2 to 1.2:1, but preferably 1:1.05 to 1.05:1, until the residual content of compounds of the general formula (IV) is from 2 to 15 percent by weight, preferably from 3 to 10 percent by weight.

In the second step, the unreacted fraction of the compounds of the general formula (IV) is removed by distillation.

Polyaspartic ester-containing components A that comprise only polyaspartic esters of the general formula (I), but not of the formula (II), can be prepared in an analogous manner, but using an excess of compounds of the general formula IV, i.e. in a ratio of equivalents of primary amino groups in the compounds of the general formula (III) to C=C double bond equivalents in the compounds of the general formula (IV) of 1:10, preferably 1:5, more preferably 1:2.

Suitable conditions during the distillation are a pressure range between 0.01 and 2 mbar and a temperature of the bottom outflow on exiting the distillation apparatus of ≤170° C. and ≥ the temperature resulting from the following formula (V):

$$T(\text{bottom outflow})=27\times\ln(p)+150 \quad (V)$$

where
T(bottom outflow) is the temperature of the bottom outflow in ° C. and
p is the pressure in the distillation apparatus in mbar.

Maintaining this pressure range ensures not only that moderate temperatures in the bottom outflow are sufficient for depletion of the dialkyl fumarate content to the desired extent, but that the process remains usable on an industrial scale. At lower pressure, the gas density becomes too low and the necessary apparatus consequently so large that the process becomes economically disadvantageous.

The temperature of the bottom outflow is preferably ≤170° C., but at least 20 K above the temperature resulting from formula (V); more preferably it is between 20 K and 40 K above the temperature resulting from formula (V), but not higher than 170° C.

Compounds of the general formula (III) that can be used in the process described above are all known polyamines having primary amino groups that conform to the general formula (III). Examples include the following compounds: ethylenediamine, 1,2-diaminopropane, 1,4-diaminobutane, 1,5-diaminopentane, 2,5-diamino-2,5-dimethylhexane, 1,5-di amino-2-methylpentane (Dytek®A, from Invista), 1,6-diaminohexane, 2,2,4- and/or 2,4,4-trimethyl-1,6-diaminohexane, 1,11-diaminoundecane, 1,12-diaminododecane or triaminononane, etheramines such as 4,9-dioxadodecane-1, 12-diamine, 4,7,10-trioxatridecane-1,13-diamine or higher-molecular-weight polyether polyamines having aliphatically attached primary amino groups, for example those marketed under the Jeffamine® name by Huntsman. Also employable are aliphatic polycyclic polyamines such as tricyclodecanebismethylamine (TCD diamine) or bis(aminomethyl) norbornanes, amino-functional siloxanes, for example diaminopropylsiloxane G10 DAS (from Momentive), oleoalkyl-based amines, for example Fentamine from Solvay, dimeric fatty acid diamines such as Priamine from Croda.

In the process described above, preference is given to using polyamines of the general formula (III) in which m=2 and X is a cyclic hydrocarbon radical having at least one cyclic carbon ring. Examples of diamines that may be used with particular preference are 1-amino-3,3,5-trimethyl-5-aminomethylcyclohexane (IPDA), 2,4- and/or 2,6-hexahydrotolylenediamine (H6-TDA), isopropyl-2,4-diaminocyclohexane and/or isopropyl-2,6-diaminocyclohexane, 1,3-bis(aminomethyl)cyclohexane, 2,4'-, and/or 4,4'-diaminodicyclohexylmethane, 3,3'-dimethyl-4,4'-diaminodicyclohexylmethane (Laromin® C 260, BASF AG), the isomeric diaminodicyclohexylmethanes substituted in the ring with a methyl group (=C-monomethyl-diaminodicyclohexylmethanes), 3(4)-aminomethyl-1-methylcyclohexylamine (AMCA), and also araliphatic diamines such as 1,3-bis(aminomethyl)benzene or m-xylylenediamine.

In the process according to the invention, preference is also given to using polyamines of the general formula (III) selected from the following group: polyether polyamines having aliphatically attached primary amino groups, 1,2-diaminopropane, 1,4-diaminobutane, 1,5-diaminopentane, 1,6-diaminohexane, 1,5-diamino-2-methylpentane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 2,4'- and/or 4,4'-diaminodicyclohexylmethane or 3,3'-dimethyl-4,4'-diaminodicyclohexylmethane. Particular preference is given to 3,3'-dimethyl-4,4'-diaminodicyclohexylmethane, 2,4'- and/or 4,4'-diaminodicyclohexylmethane, 1,5-diamino-2-methylpentane, and very particular preference to using 2,4'- and/or 4,4'-diaminodicyclohexylmethane.

In the process according to the invention, particular preference is given to using polyamines of the general formula (III) selected from the following group: polyether polyamines having aliphatically attached primary amino groups, 1,2-diaminopropane, 1,4-diaminobutane, 1,5-diaminopentane, 1,6-diaminohexane, 1,5-diamino-2-methylpentane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 2,4'- and/or 4,4'-diaminodicyclohexylmethane or 3,3'-dimethyl-4,4'-diaminodicyclohexylmethane.

Very particular preference is given to using, in the process according to the invention, polyamines of the general formula (III) selected from the group 3,3'-dimethyl-4,4'-diaminodicyclohexylmethane, 2,4'- and/or 4,4'-diaminodicyclohexylmethane and 1,5-diamino-2-methylpentane.

Preferred compounds of the general formula (IV) that are used in the process described above are maleic or fumaric esters of the general formula (IV) in which R1 and R2 are identical or different organic radicals each having 1 to 18 carbon atoms. Preferably, R1 and R2 are independently linear or branched alkyl radicals having 1 to 8 carbon atoms, more preferably are each alkyl radicals such as methyl, ethyl, propyl, isopropyl, butyl or isobutyl radicals and particularly preferably ethyl.

Examples of compounds of the general formula (IV) include the following compounds: dimethyl maleate, diethyl maleate, di-n-propyl or diisopropyl maleate, di-n-butyl maleate, di-2-ethylhexyl maleate or the corresponding fumaric esters. Very particular preference is given to diethyl maleate.

The two-component coating compositions according to the invention comprise at least one polyisocyanate component B.

Suitable polyisocyanate components B are organic polyisocyanates having an average NCO functionality of at least 2 and a molecular weight of at least 140 g/mol. Particularly well suited are unmodified organic polyisocyanates in the molecular weight range from 140 to 300 g/mol, paint polyisocyanates in the molecular weight range from 300 to 1000 g/mol and NCO prepolymers having urethane, urea and/or allophanate groups and a molecular weight above 400 g/mol, or mixtures thereof.

In the context of the invention, the term "paint polyisocyanates" is understood as meaning compounds or mixtures of compounds that can be obtained from simple polyisocyanates by an oligomerization reaction known per se. Examples of suitable oligomerization reactions are carbodiimidization, dimerization, trimerization, biuretization, urea formation, urethanization, allophanatization and/or cyclization with formation of oxadiazine structures. Oligomerization may consist of more than one of the above-mentioned reactions performed simultaneously or in succession.

The "paint polyisocyanates" are preferably biuret polyisocyanates, polyisocyanates containing isocyanurate groups, mixtures of polyisocyanates containing isocyanurate and uretdione groups, polyisocyanates containing urethane and/or allophanate groups, or mixtures of polyisocyanates containing isocyanurate groups and allophanate groups based on simple organic polyisocyanates. Likewise suitable as polyisocyanate component B are prepolymers containing isocyanate groups that are known per se and based on simple organic polyisocyanates and/or based on paint polyisocyanates on the one hand and organic polyhydroxy compounds having a molecular weight above 300 g/mol on the other hand. Whereas the paint polyisocyanates containing urethane groups are derivatives of low-molecular-weight polyols in the molecular weight range from 62 to 300 g/mol, suitable polyols being, for example, ethylene glycol, propylene glycol, trimethylolpropane, glycerol or mixtures of these alcohols, the prepolymers containing isocyanate groups are prepared using polyhydroxy compounds having a molecular weight above 300 g/mol, preferably above 400 g/mol, more preferably between 400 and 8000 g/mol. Such polyhydroxyl compounds are in particular those having 2 to 6, preferably 2 to 3, hydroxyl groups per molecule and are selected from the group consisting of ether, ester, thioether, carbonate and polyacrylate polyols and mixtures of such polyols.

In the preparation of the prepolymers containing isocyanate groups, the mentioned higher-molecular-weight polyols may also be used in the form of mixtures with the mentioned low-molecular-weight polyols, giving rise directly to mixtures of low-molecular-weight paint polyisocyanates containing urethane groups and higher-molecular-weight NCO prepolymers that are likewise suitable as polyisocyanate component b) according to the invention.

For the preparation of the prepolymers containing isocyanate groups or mixtures thereof with paint polyisocyanates, simple organic polyisocyanates of the type mentioned by way of example below or paint polyisocyanates are reacted with higher-molecular-weight hydroxyl compounds or mixtures thereof with low-molecular-weight polyhydroxyl compounds of the type mentioned by way of example, while maintaining an NCO/OH equivalents ratio of 1.1:1 to 40:1, preferably 2:1 to 25:1, with urethane and/or allophanate formation. If using an excess of a distillable simple organic polyisocyanate, this may optionally be removed after the reaction by distillation, with the result that NCO prepolymers containing monomer-free isocyanate groups are present that may likewise be used as polyisocyanate component b).

Examples of suitable simple organic polyisocyanates are 1,4-diisocyanatobutane, 1,5-diisocyanatopentane, 1,6-diisocyanatohexane (HDI), 1,5-diisocyanato-2,2-dimethylpentane, 2,2,4- and 2,4,4-trimethyl-1,6-diisocyanatohexane, tetramethylxylylene diisocyanate (TMXDI) 1-isocyanato-3,3,5-trimethyl-5-isocyanatomethylcyclohexane (isophorone diisocyanate, IPDI), 1-isocyanato-1-methyl-4(3)-isocyanatomethylcyclohexane, dicyclohexylmethane 2,4'-diisocyanate and/or 4,4'-diisocyanate, 1,10-diisocyanatodecane, 1,12-diisocyanatododecane, cyclohexane 1,3- and 1,4-diisocyanate, xylylene diisocyanate isomers, triisocyanatononane (TIN), naphthylene 1,5-diisocyanate, 2,4-diisocyanatotoluene or mixtures thereof with 2,6-diisocyanatotoluene preferably containing, based on mixtures, up to 35% by weight of 2,6-diisocyanatotoluene, 2.2'-, 2,4'-, 4,4'-diisocyanatodiphenylmethane or technical polyisocyanate mixtures of the diphenylmethane series, or any desired mixtures of the polyisocyanates mentioned.

Preference here is given to using aliphatic, cycloaliphatic or araliphatic polyisocyanates selected from the group 1,4-diisocyanatobutane, 1,5-diisocyanatopentane, 1,6-diisocyanatohexane (HDI), 1,5-diisocyanato-2,2-dimethylpentane, 2,2,4- or 2,4,4-trimethyl-1,6-diisocyanatohexane, tetramethylxylylene diisocyanate (TMXDI) 1-isocyanato-3,3,5-trimethyl-5-isocyanatomethylcyclohexane (isophorone diisocyanate, IPDI), 1-isocyanato-1-methyl-4(3)-isocyanatomethylcyclohexane, dicyclohexylmethane 2,4'- and/or 4,4'-diisocyanate, 1,10-diisocyanatodecane, 1,12-diisocyanatododecane, cyclohexane 1,3- and 1,4-diisocyanate, xylylene diisocyanate isomers, triisocyanatononane (TIN), or any desired mixtures of such polyisocyanates.

In principle, it is of course also possible to use mixtures of different polyisocyanate components of the type mentioned above.

In addition to the polyaspartic ester-containing component A, the two-component composition according to the invention may comprise further components (components C) that are reactive towards isocyanate groups.

These may, for example, be low-molecular-weight polyols in the molecular weight range from 62 to 300 g/mol, for example ethylene glycol, propylene glycol, trimethylolpropane, glycerol or mixtures of these alcohols, or polyhydroxy compounds having a molecular weight above 300 g/mol, preferably above 400 g/mol, more preferably between 400 and 8000 g/mol. Such polyhydroxyl compounds are in particular those having 2 to 6, preferably 2 to 3, hydroxyl groups per molecule and are selected from the group consisting of ether, ester, thioether, carbonate and polyacrylate polyols and mixtures of such polyols.

In addition, the two-component composition according to the invention comprises at least one inorganic and/or organic pigment (component D1), for example, titanium dioxide, zinc oxide, iron oxides, chromium oxides or carbon blacks.

The proportion of pigments in the composition is preferably not less than 3% by weight (≥3% by weight), more preferably 5% to 40% by weight (≥5% to ≤40% by weight), most preferably 10% to 35% by weight (≥5% to ≤40% by weight), based on the total weight of the two-component composition.

A comprehensive review of pigments for coatings is given in "Lehrbuch der Lacke and Beschichtungen [Textbook on paints and coatings], volume II, "Pigmente, Füllstoffe, Farbstoffe" [Pigments, fillers, dyes], H. Kittel, Verlag W. A. Colomb in der Heenemann GmbH, Berlin-Oberschwandorf, 1974, pp. 17-265.

In addition, the composition according to the invention may comprise further auxiliaries and additives typical for coating technology with polyisocyanate polyaddition compounds, and for polyurethane compounds in particular (component D2):

Examples are catalysts/activators such as titanium-, zirconium-, bismuth-, tin- and/or iron-containing catalysts, as described, for example, in WO 05058996. It is also possible to add amines or amidines. The proportion of crosslinking catalysts in the composition is preferably 0.001% to 5% by weight (≥0.001% to ≤5% by weight), preferably 0.005% to 2% by weight (≥0.005% to ≤2% by weight), more preferably 0.01% to 1% by weight (≥0.01% to ≤1% by weight), based on the total weight of the two-component composition.

Examples of other suitable auxiliaries and additives D2 are coatings additives, for instance light stabilizers such as UV absorbers and sterically hindered amines (HALS), and also stabilizers, defoaming agents, anticratering and/or wetting agents, levelling agents, film-forming auxiliaries, reactive diluents, biocides, solvents or substances for rheology control. The use of light stabilizers, especially of UV absorbers, for example substituted benzotriazoles, S-phenyltriazines or oxalanilides, and of steric ally hindered amines, especially those having a 2,2,6,6-tetramethylpiperidyl structure—referred to as HALS—is described by way of example in A. Valet, Lichtschutzmittel für Lacke [Light stabilizers for paints], Vincentz Verlag, Hanover, 1996.

Stabilizers, for example free-radical scavengers, and other polymerization inhibitors such as sterically hindered phenols stabilize paint components during storage and are intended to prevent discoloration during curing. Wetting and levelling agents improve surface wetting and/or the levelling of coatings. Examples are fluorosurfactants, silicone surfactants and specific polyacrylates. Rheology-control additives are important in order to control the properties of the two-component system on application and in the levelling phase on the substrate and are disclosed, for example, in patent specifications WO 9422968, EP0276501, EP0249201 or WO 9712945. It is additionally possible to employ water scavengers, for example triethyl orthoformate, toluenesulfonyl isocyanate, monooxazolidines or molecular sieves, and hydrolysis stabilizers, for example carbodiimides. The proportion of coatings additives in the composition is preferably 0.5% to 15% by weight (≥0.5% to ≤15% by weight), preferably 1% to 10% by weight (≥1% to ≤10% by weight), more preferably 2% to 7% by weight (≥2% to ≤7% by weight), based on the total weight of the two-component composition. A comprehensive review of paint additives is given in "Lehrbuch der Lacke and Beschichtungen [Textbook on paints and coatings], volume III, "Lösemittel, Weichmacher, Additive, Zwischenprodukte" [Solvents, plasticizers, additives, intermediates], H. Kittel, Verlag W. A. Colomb in der Heenemann GmbH, Berlin-Oberschwandorf, 1976, pp. 237-398.

Further auxiliaries and additives D2 are fillers. Examples of suitable fillers are baryte, chalk or talc. Fillers having a barrier effect may also be used, for example plate-like phyllosilicates or layered aluminosilicates, graphite, aluminium platelets or barrier pigments such as iron mica and nanofillers such as clays and aluminium silicates, wherein the fillers may be used alone or in combination. The proportion of fillers in the coating is preferably 1% to 30% by weight (≥1% to ≤30% by weight), preferably 3% to 20% by weight (≥3% to ≤20% by weight), more preferably 5% to 15% by weight (≥5% to ≤15% by weight), based on the total weight of the two-component composition. A comprehensive review of fillers for coatings is given in "Lehrbuch der Lacke and Beschichtungen [Textbook on paints and coatings], volume II, "Pigmente, Füllstoffe, Farbstoffe" [Pigments, fillers, dyes], H. Kittel, Verlag W. A. Colomb in der Heenemann GmbH, Berlin-Oberschwandorf, 1974, pp. 17-265.

Solvents are also regarded as auxiliaries and additives D2. The solvent may be an organic solvent or a mixture of organic solvents, or water or a mixture of organic solvent(s) and water. Suitable solvents should be used in a manner known to those skilled in the art, with this use tailored to the composition and to the application process. Solvents are intended to dissolve the components used and promote the mixing thereof, and to avoid incompatibilities. In addition, during application and curing, they should escape from the coating in a manner tailored to the crosslinking reaction in progress so as to afford a solvent-free coating of optimal appearance and free of defects such as popping or pinholes. Suitable solvents include in particular those used in two-component technology. Examples of organic solvents are ketones such as acetone, methyl ethyl ketone or hexanone, esters such as ethyl acetate, butyl acetate, methoxypropyl acetate, substituted glycols and other ethers, aromatics such as xylene or solvent naphtha, for example from Exxon-Chemie, and mixtures of the solvents mentioned. When the NCO-reactive component of the composition is in the form of an aqueous dispersion, water is also suitable as solvent or diluent. When present, the proportion of solvents in the composition is preferably 0.5% to 40% by weight ($\geq 0.5\%$ to $\leq 40\%$ by weight), preferably 1% to 30% by weight ($\geq 1\%$ to $\leq 30\%$ by weight), more preferably 2% to 25% by weight ($\geq 2\%$ to $\leq 25\%$ by weight), based on the total weight of the two-component composition.

The ratio of polyisocyanate component B to polyaspartic ester-containing component A in the composition, based on the molar amounts of polyisocyanate groups in relation to NCO-reactive groups, is preferably from 0.5:1.0 to 3.0:1.0. Particular preference is given to a ratio of 0.9:1.0 to 1.5:1.0 Very particular preference is given to a ratio of 1.05:1.0 to 1.25:1.0

The two-component composition according to the invention is preferably not a foamable or foam-forming composition. The composition is preferably not radically polymerizable, especially not photopolymerizable, i.e. the composition does not cure through radical processes, especially not through radical polymerization processes initiated by actinic radiation.

The two-component coating composition according to the invention is produced by methods known per se in paint and coatings technology.

An isocyanate-reactive (R) and an isocyanate-containing component (H) are first prepared separately by mixing the respective isocyanate-reactive components A and C or by mixing the respective polyisocyanate components B. The auxiliaries and additives D1 and D2 are preferably admixed with the isocyanate-reactive component R. The components R and H thus produced are not mixed until immediately before or during application. When mixing takes place before application, it should be noted that the reaction of the constituents commences immediately after mixing. The rate of the reaction varies according to the choice of components and additives. The processing time within which the composition must be applied is also known as the pot life and is defined as the time from mixing of the components until doubling of the initial viscosity and/or flow time (determined according to DIN EN ISO 2431:2012-03, but using a DIN 4 flow cup); depending on the choice of components, this is in the range from 1 minute to 24 hours, usually in the range from 10 minutes to 8 hours. The pot life is determined by methods known to those skilled in the art.

In a preferred embodiment, the isocyanate-reactive components are mixed, optionally accompanied by, or followed by, dispersion, and are then milled. The latter may done using, for example, a bead mill. Milling may be followed by a sieving step.

The invention also relates to a process for coating a substrate, which comprises at least the following steps:

i) applying the two-component coating composition described above to at least part of a substrate to be coated and ii) curing the coating composition from step i).

The present invention accordingly further provides for the use of the two-component coating compositions according to the invention in the production of coatings on substrates, the process described above for coating a substrate, and the coated substrates themselves that are obtainable in this way.

The substrates may have already been coated wholly or partly with one or more coating layers. These coating layers may still be uncured or wet, partly cured or fully cured; the further coating layers on the substrate are preferably partly cured or fully cured. Examples of coating layers are priming coats, primers, fillers, spackling coats, basecoats, or substrates that have already been fully painted and are being recoated after possible pretreatment such as sanding or plasma activation.

The two-component coating compositions are used in particular for the production of coatings for corrosion protection, general industrial painting and for use in the field of ACE (agriculture, construction and earth-moving equipment). The coatings here are preferably topcoats.

The present invention accordingly further provides preferably for the use of the two-component coating compositions described above in the production of topcoats on substrates, the process described above for coating substrates with these topcoats, and the coated substrates themselves that are obtainable in this way.

It additionally provides for the use of topcoats in the field of corrosion protection, general industrial painting or as ACE coatings.

The coating composition may be applied by customary application methods. Examples of application methods are application with a coarse or fine brush, roller application, knife application, dipping and spraying, with preference given to spray application. After an optional flash-off time, application is followed by the curing or drying of the composition according to the invention on the substrate or object. This is carried out according to methods that are customary in coating technology, either under ambient conditions (temperature and atmospheric humidity) or under forced conditions, for example by raising the oven temperature, using radiation such as infrared, near-infrared or microwave radiation, and using dehumidified and/or heated air or other gases. This is preferably done without using devices for forced curing. The applied coating composition is cured, for example, at temperatures from −20 to 100° C., preferably from −10 to 80° C., more preferably from 0 to 60° C. and most preferably from 10 to 40° C. Although not preferred, lower curing temperatures may also be employed, but will result in longer curing times.

It is likewise possible, although not preferred, to cure the composition at higher temperatures, for example 80 to 160° C. or higher.

After the first coating has cured, a further coating may be applied and likewise cured.

The invention further provides for the use of the two-component coating compositions in the production of gloss-stable coatings.

Experimental Section

Raw Materials and Substrates:
PACM 20: A mixture of 2,4- and 4,4'-diaminodicyclohexylmethane, manufacturer: Evonik Desmodur N 3600: A low-viscosity HDI trimer containing approx. 23% NCO and ≤0.25% free HDI, manufacturer: Covestro Desmodur XP 2489: An aliphatic polyisocyanate based on HDI and isophorone diisocyanate trimer containing approx. 21% NCO, manufacturer Covestro UOP L powder: Molecular sieve, Honeywell UOP, USA Byk A 530: Defoamer, Byk-Chemie GmbH, Germany Disperbyk 163: Dispersant, Byk-Chemie GmbH, Germany Titanium dioxide R-KB-4: Pigment, various suppliers Chromium Oxide Green GN: Pigment, various suppliers Iron Oxide Yellow 415: Pigment, various suppliers Heucophos® ZPA: Corrosion-protection pigment, Heubach GmbH, Germany Baryte EWO: Baryte filler, Sachtleben, Germany Microtalc IT Extra: Talc filler, Mondo Minerals, the Netherlands CAB-O-SIL TS 720: Rheology additive, Cabot Aerogel, Germany Tinuvin 292: Light stabilizer, BASF, Germany Solvent: Solvesso 100, 1-methoxy-2-propyl acetate (MPA) and butyl acetate (BA), Azelis, Germany Methods Diethyl fumarate contents were quantified using a GC method with an internal standard. An Agilent 6890 gas chromatograph with a standard GC capillary (100% polysiloxane phase) and FID detector were used. The injector temperature (split outlet) was 180° C.; helium was used as the carrier gas. The quantitation limit of this method was 300 ppm.

GC-MS analyses were carried out using an Agilent 6890 gas chromatograph and Agilent 5973 mass spectrum detector with standard ionization (electron impact) at 70 eV, a standard GC capillary (100% polysiloxane phase) and split injection at an injector temperature of 250° C.

Evaluation of the gas chromatograms was in area-%.

All viscosity measurements were carried out using a Physica MCR 51 rheometer from Anton Paar Germany GmbH (DE) in accordance with DIN EN ISO 3219:1994-10 at 23° C.

Hazen colour index values were determined on a Lico 400 colorimeter from Hach Lange GmbH (Germany) in accordance with DIN EN ISO 6271:2016-05

Amine values were determined titrimetrically in accordance with EN ISO 9702:1998 (perchloric acid method) with the exception that the results were expressed as the amine value. The amine value in mg KOH/g was calculated according to the following equation:

$$\text{Amine value} = \frac{(a-b) \cdot 5.61}{E}$$

a=Volume of perchloric acid used in the main test, in millilitres, concentration c=0.1 mol/l (included in factor 5.61);

b=Volume of perchloric acid used in the blank test, in millilitres, concentration c=0.1 mol/l (included in factor 5.61);

E=Weight of sample, in grams

Flow times were determined in accordance with DIN EN ISO 2431:2012-03, with the exception that a DIN 4 flow cup was used.

The pot life was defined as the time taken for the viscosity to double.

Drying was determined in accordance with DIN EN ISO 9117-5:2012-11.

Weathering was carried out in accordance with DIN EN ISO 16474/2: 2014-03, method A, cycle 1 (102:18) and DIN EN ISO 16474/3: 2014-03 method C cycle 4 (UVB). Testing was carried out on single-layer topcoats on roughened aluminium.

Gloss values were determined using a reflectometer in accordance with standard DIN EN ISO 2813:2015-02.

Pendulum hardness was determined in accordance with DIN EN ISO 1522:2007-04 using a Konig pendulum on glass.

Spray application was carried out using a model SATAjet RP 3000 spray gun with a 1.6 mm SATA spray nozzle at a pressure of approx. 2.1 to 2.2 bar. Coating was carried out under the prevailing ambient conditions (slight variations in temperature and atmospheric humidity possible).

Salt spray test was carried out in accordance with DIN EN ISO 9227:2012-09 corresponding to the NSS method on samples scribed in accordance with ISO 17872. Single- and double-layer topcoats were applied to a steel sheet (blasted to SA 2½). Blistering was assessed in accordance with DIN EN ISO 4628-2:2016-07 (n.c.=no change/bl.=number of blisters/bs.=blister size). Delamination and corrosion were assessed in accordance with ISO 4628-8:2012-3.

The condensation water test was carried out in accordance with DIN EN ISO 6270-2:2005-09. Blistering was assessed in accordance with DIN EN ISO 4628-2:2016-07 (n.c.=no change/bl.=number of blisters/bs.=blister size).

The cross-cut test was carried out in accordance with DIN EN ISO 2409:2006-13.

The pull-off test was carried out in accordance with DIN EN ISO 4624:2016-08 method B.

The tensile stress and nature of fracture were assessed according to the following criteria:
A Cohesive failure in substrate;
A/B Adhesive failure between substrate and first coating;
B Cohesive failure in first coating;
B/C Adhesive failure between first and second coating;

Production of Pigmented Topcoats

The topcoats were produced at room temperature by placing the constituents of component 1 in a cooled vessel (jacketed vessel having external cooling with cold tap water) and predispersing at approx. 600-800 rpm with the aid of a dissolver, after which they were milled in a bead mill and then screened. Component 1 was processed after a maturation time of one day.

Component 2 was then added while stirring slowly (approx. 600-800 rpm) and was then dispersed at 2000 rpm for 1 minute (coatings 1) or at 2800 rpm for 30 minutes (coatings 2).

Single-Layer Structure

The topcoats used were applied by means of the described spray application to a steel sheet (blasted SA 2½) or to a roughened aluminium plate and dried at 23° C./50% rel. humidity.

Double-Layer Structure

A 1C PUR zinc dust basecoat was applied by means of the described spray application to a steel sheet (blasted to SA 2½) in accordance with the guideline formulation of Covestro Deutschland AG with the designation RR 5280. After this basecoat had dried, the topcoat was likewise applied by means of the described spray application and dried at 23° C./50% rel. humidity.

Polyaspartic Ester PAE 1

Polyaspartic ester commercially available from Covestro under the name Desmophen NH 1420.
Material Data:

| | |
|---|---|
| Monoamine of the formula (II) (GC-MS): | 4.0% |
| Diethyl fumarate (GC) | 2.9% by weight |
| Viscosity | 1220 mPas |
| Colour index | 27 APHA |
| Amine value | 201 mg KOH/g |

Polyaspartic Ester PAE 2

341.8 g of PACM 20 was initially charged at 23° C. under dry nitrogen, with stirring. To this was added dropwise 560.0 g of diethyl maleate, ensuring that the temperature did not rise above 60° C. At the end of the addition, the temperature was adjusted to 45° C. and the mixture was stirred at 45° C. for 2 hours. The mixture was then stored at 23° C. for 7 weeks. The content of diethyl fumarate after storage was 3.0% by weight. Diethyl fumarate was then distilled off at 120° C. and 0.2 mbar. A light-coloured product was obtained that had the following material data:

| | |
|---|---|
| Monoamine of the formula (II) (GC-MS): | 4.2% |
| Diethyl fumarate (GC) | 0.05% by weight |
| Viscosity | 1860 mPas |
| Colour index | 19 APHA |
| Amine value | 203 mg KOH/g |

Polyaspartic Ester PAE 3

341.8 g of PACM 20 was initially charged at 23° C. under dry nitrogen, with stirring. To this was added dropwise 560.0 g of diethyl maleate, ensuring that the temperature did not rise above 60° C. At the end of the addition, the temperature was adjusted to 45° C. and the mixture was stirred at 45° C. for 2 hours. The mixture was then stored at 23° C. for 9 weeks. The content of diethyl fumarate after storage was 2.7% by weight. Diethyl fumarate was then distilled off at 120° C. and 0.2 mbar. A light-coloured product was obtained that had the following material data:

| | |
|---|---|
| Monoamine of the formula (II) (GC-MS): | 5.3% |
| Diethyl fumarate (GC) | 0.09% by weight |
| Viscosity | 1810 mPas |
| Colour index | 27 APHA |
| Amine value | 206 mg KOH/g |

Polyaspartic Ester PAE 4

341.8 g of PACM 20 was initially charged at 23° C. under dry nitrogen, with stirring. To this was added dropwise 567.6 g of diethyl maleate, ensuring that the temperature did not rise above 60° C. At the end of the addition, the temperature was adjusted to 45° C. and the mixture was stirred at 45° C. for two hours. The mixture was then stored at 23° C. for 30 hours. The content of diethyl fumarate after storage was 8.62% by weight. Diethyl fumarate was then distilled off at 120° C. and 0.2 mbar. A light-coloured product was obtained that had the following material data:

| | |
|---|---|
| Monoamine of the formula (II) (GC-MS): | 13.2% |
| Diethyl fumarate (component A, GC) | <0.03% by weight |
| Viscosity | 1650 mPas |
| Colour index | 5 APHA |
| Amine value | 213 mg KOH/g |

Polyaspartic Ester PAE 5

341.8 g of PACM 20 was initially charged at 23° C. under dry nitrogen, with stirring. To this was added dropwise 1678.8 g of diethyl maleate, ensuring that the temperature did not rise above 60° C. At the end of the addition, the temperature was adjusted to 45° C. and the mixture was stirred at 45° C. for one hour. The mixture was then stored at 23° C. for 24 hours. Diethyl fumarate was then distilled off at 120° C. and 0.2 mbar. A light-coloured product was obtained that had the following material data:

| | |
|---|---|
| Monoamine of the formula (II) (GC-MS): | 9.3% |
| Diethyl fumarate (component A, GC) | 0.07% by weight |
| Viscosity | 1710 mPas |
| Colour index | 21 APHA |
| Amine value | 209 mg KOH/g |

Polyaspartic esters PAE 1, 2, 3 and PAE 5 were formulated into topcoats, as shown in t able 1 and 7.

TABLE 1

| | Composition of topcoats 1 | | | | | | | |
|---|---|---|---|---|---|---|---|---|
| Component 1 (% by weight) | Example 1 (comparative) | Example 2 (according to the invention) | Example 3 (according to the invention) | Example 4 (comparative) | Example 5 (according to the invention) | Example 6 (according to the invention) | Example 7 (comparative) | Example 8 (according to the invention) |
| PAE 1 | 27.7 | | | 27.9 | | | 27.3 | |
| PAE 2 | | 27.7 | | | 27.9 | | | |
| PAE 3 | | | 27.7 | | | 27.9 | | |
| PAE 5 | | | | | | | | 25.9 |
| UOP L powder | 3.0 | 3.0 | 3.0 | 3.0 | 3.0 | 3.0 | 2.8 | 2.7 |
| MPA/BA 1:1 | 7.9 | 7.9 | 7.9 | 7.7 | 7.7 | 7.7 | 7.5 | 7.3 |
| Byk A 530 | 0.4 | 0.4 | 0.4 | 0.4 | 0.4 | 0.4 | 0.4 | 0.4 |
| Disperbyk 163 | 1.4 | 1.4 | 1.4 | 1.4 | 1.4 | 1.4 | 1.3 | 1.3 |
| Titanium dioxide R-KB-4 | 33.7 | 33.7 | 33.7 | 18.1 | 18.1 | 18.1 | 17.6 | 17.1 |
| Heucophos ZPA | | | | 11.3 | 11.3 | 11.3 | 11.0 | 10.6 |

TABLE 1-continued

Composition of topcoats 1

| Component 1 (% by weight) | Example 1 (comparative) | Example 2 (according to the invention) | Example 3 (according to the invention) | Example 4 (comparative) | Example 5 (according to the invention) | Example 6 (according to the invention) | Example 7 (comparative) | Example 8 (according to the invention) |
|---|---|---|---|---|---|---|---|---|
| Baryte EWO |  |  |  | 4.1 | 4.1 | 4.1 | 4.0 | 3.9 |
| Tinuvin 292 | 0.7 | 0.7 | 0.7 | 0.7 | 0.7 | 0.7 | 0.7 | 0.6 |
| Component 2 (% by weight) |  |  |  |  |  |  |  |  |
| Desmodur N 3600 (80% in MPA/BA 1:1) | 25.2 | 25.2 | 25.2 | 25.4 | 25.4 | 25.4 |  |  |
| Desmodur XP 2489 (80% in MPA/BA 1:1) |  |  |  |  |  |  | 27.4 | 30.2 |
|  | 100.0 | 100.0 | 100.0 | 100.0 | 100.0 | 100.0 | 100.0 | 100.0 |

The pot life and drying of the topcoats from examples 1 to 8 are summarized in tables 2 and 3.

TABLE 2

Drying and pot life of the topcoats from examples 1 to 6.

| | Example 1 | Example 2 | Example 3 | Example 4 | Example 5 | Example 6 |
|---|---|---|---|---|---|---|
| Drying 23° C./50% rel. humidity 150 µm wet | | | | | | |
| T1 | 30 min | 15 min | 15 min | 30 min | 15 min | 15 min |
| T2 | 45 min | 30 min | 30 min | 30 min | 30 min | 30 min |
| T3 | 45 min | 45 min | 30 min | 45 min | 45 min | 45 min |
| T4 | 60 min | 45 min | 45 min | 45 min | 45 min | 45 min |
| T6 | 60 min | 45 min | 45 min | 45 min | 45 min | 45 min |
| Flow time 23° C./50% rel. humidity | | | | | | |
| 0 min | 30 s | 30 s | 30 s | 30 s | 30 s | 32 s |
| 15 min | 38 s | 33 s | 33 s | 39 s | 37 s | 37 s |
| 30 min | 45 s | 37 s | 37 s | 54 s | 44 s | 46 s |
| 45 min | 60 s | 42 s | 38 s | 74 s | 57 s | 58 s |
| 60 min | 69 s | 45 s | 45 s | 95 s | 68 s | 69 s |
| 75 min | 87 s | 48 s | — | >2 min | 80 s | 79 s |
| 90 min | — | 60 s | 66 s | — | >2 min | >2 min |

TABLE 3

Drying and pot life of the topcoats from examples 7 and 8.

| | | Example 7 | Example 8 |
|---|---|---|---|
| Drying 23° C./50% rel. humidity 150 µm wet | T1 | 30 min | 30 min |
| | T2 | 45 min | 45 min |
| | T3 | 45 min | 45 min |
| | T4 | 60 min | 60 min |
| | T6 | 60 min | 60 min |
| Flow time 23° C./50% rel. humidity | 0 min | 36 s | 30 s |
| | 15 min | 45 s | 39 s |
| | 30 min | 48 s | 40 s |
| | 45 min | 60 s | 48 s |
| | 60 min | 75 s | 60 s |

As can be seen from table 2, the coating compositions according to the invention exhibit more rapid drying allied with a longer pot life by comparison with coating compositions based on conventional polyaspartic esters. The coating compositions according to the invention shown in table 3 likewise have a longer pot life alongside the same rapid drying.

The cured topcoats from examples 4, 5, 7 and 8 were also subjected to weathering. The results are shown in tables 4 to 6.

TABLE 4

UV-B test on the coatings from examples 4 and 5.

| | Start | | 500 h | | 1000 h | | Delta E | 1500 h | | Delta E |
|---|---|---|---|---|---|---|---|---|---|---|
| Gloss | 20° | 60° | 20° | 60° | 20° | 60° | | 20° | 60° | |
| Example 4 | 96 | 98 | 60 | 88 | 58 | 87 | 0.5 | 45 | 81 | 0.6 |
| Example 5 | 94 | 98 | 70 | 91 | 66 | 89 | 0.5 | 46 | 82 | 0.6 |

TABLE 5

Xenon test on the coatings from examples 4 and 5.

| | Start | | 500 h | | 1000 h | | Delta E | 1500 h | | Delta E |
|---|---|---|---|---|---|---|---|---|---|---|
| Gloss | 20° | 60° | 20° | 60° | 20° | 60° | | 20° | 60° | |
| Example 4 | 94 | 97 | 82 | 93 | 69 | 91 | 0.3 | 54 | 87 | 0.2 |
| Example 5 | 94 | 97 | 87 | 95 | 76 | 93 | 0.2 | 72 | 92 | 0.2 |
| | 2000 h | | 2500 h | | 3000 h | | Delta E | 3500 h | | Delta E |
| Gloss | 20° | 60° | 20° | 60° | 20° | 60° | | 20° | 60° | |
| Example 4 | 48 | 84 | 44 | 82 | 42 | 81 | 0.3 | 40 | 80 | 0.3 |
| Example 5 | 66 | 90 | 60 | 88 | 56 | 87 | 0.3 | 53 | 86 | 0.3 |

TABLE 6

Xenon test on the coatings from examples 7 and 8.

| | Start | | 500 h | | 1000 h | | 1500 h | |
|---|---|---|---|---|---|---|---|---|
| Gloss | 20° | 60° | 20° | 60° | 20° | 60° | 20° | 60° |
| Example 7 | 88 | 91 | 84 | 94 | 78 | 93 | 73 | 92 |
| Example 8 | 90 | 94 | 85 | 94 | 78 | 93 | 75 | 92 |
| | 3000 h | | 4000 h | | 5000 h | | Delta E | |
| Gloss | 20° | 60° | 20° | 60° | 20° | 60° | | |
| Example 7 | 66 | 89 | 61 | 84 | 48 | 78 | 0.5 | |
| Example 8 | 68 | 89 | 64 | 86 | 54 | 82 | 0.2 | |

As the weathering results show, the coating compositions according to the invention exhibit a slower loss of gloss and a higher or at least equally high residual gloss by comparison with the coating composition based on conventional polyaspartic esters.

TABLE 7

Composition of topcoats 2

| Component 1 (% by weight) | Example 9 (comparative) | Example 10 (according to the invention) | Example 11 (according to the invention) | Example 12 (comparative) | Example 13 (according to the invention) | Example 14 (according to the invention) |
|---|---|---|---|---|---|---|
| PAE 1 | 29.33 | | | 28.11 | | |
| PAE 5 | | 28.81 | | | 27.65 | |
| PAE 3 | | | 29.21 | | | 28.03 |
| Disperbyk 163 | 1.38 | 1.36 | 1.38 | 0.95 | 0.93 | 0.95 |
| Byk A 530 | 0.64 | 0.63 | 0.64 | 0.95 | 0.93 | 0.95 |
| Tinuvin 292 | 0.64 | 0.63 | 0.64 | 0.59 | 0.58 | 0.59 |
| UOP L powder | 3.04 | 3.05 | 3.06 | 2.36 | 2.36 | 2.36 |
| Chromium Oxide Green GN | 7.70 | 7.71 | 7.71 | 6.09 | 6.10 | 6.09 |
| Titanium dioxide R-KB-4 | 11.12 | 11.12 | 11.12 | 8.78 | 8.79 | 8.78 |
| Baryte EWO | 4.21 | 4.22 | 4.21 | 16.38 | 16.41 | 16.38 |
| Heucophos ZPA | 11.47 | 11.48 | 11.47 | | | |
| Microtalc IT Extra | | | | 4.67 | 4.67 | 4.67 |
| Iron Oxide Yellow 415 | 1.38 | 1.39 | 1.39 | 1.09 | 1.09 | 1.09 |
| CAB-O-SIL TS 720 | 0.94 | 0.95 | 0.95 | 1.09 | 1.09 | 1.09 |
| BA | 3.41 | 3.36 | 3.40 | | | |
| MPA | 3.41 | 3.36 | 3.40 | 8.44 | 8.31 | 8.42 |
| Component 2 (% by weight) | | | | | | |
| Desmodur N 3600 | 21.33 | 21.94 | 21.45 | 20.51 | 21.07 | 20.60 |
| | 100.00 | 100.00 | 100.00 | 100.00 | 100.00 | 100.00 |

TABLE 8

Drying and pot life of the topcoats from examples 9 to 14.

| | Example 9 (comparative) | Example 10 (according to the invention) | Example 11 (according to the invention) | Example 12 (comparative) | Example 13 (according to the invention) | Example 14 (according to the invention) |
|---|---|---|---|---|---|---|
| Drying 23° C./50% rel. humidity 150 μm wet | | | | | | |
| T1 | 35 min | 30 min | 20 min | 25 min | 25 min | 25 min |
| T6 | 51 min | 51 min | 42 min | 1 h 3 min | 1 h | 49 min |
| Pendulum hardness: | | | | | | |
| after 1 d | 141 s | 153 s | 153 s | 117 s | 124 s | 112 s |
| after 3 d | 149 s | 157 s | 157 s | 129 s | 132 s | 130 s |
| after 7 d | 152 s | 157 s | 158 s | 141 s | 145 s | 142 sec |
| Pot life: 23° C./50% rel. humidity | 1 h 6 min | 1 h 20 min | 1 h 30 min | 2 h | 2 h 10 min | 3 h |

Chemical resistance

| Stress (min) | 1 | 5 | 10 | 1 | 5 | 10 | 1 | 5 | 10 | 1 | 5 | 10 | 1 | 5 | 10 | 1 | 5 | 10 |
|---|---|---|---|---|---|---|---|---|---|---|---|---|---|---|---|---|---|---|
| Solvesso 100 | 0 | 0 | 0 | 0 | 0 | 0 | 0 | 0 | 0 | 0 | 0 | 0 | 0 | 0 | 0 | 0 | 0 | 0 |
| MPA | 0 | 0-1 | 1 | 0 | 0 | 0 | 0 | 0 | 0 | 0 | 0 | 1 | 0 | 0 | 0 | 0 | 1 | 1-2 |
| Acetone | 1 | 3 | 4-5 | 0-1 | 4 | 4-5 | 0-1 | 4 | 4-5 | 1-2 | 4 | 4 | 1-2 | 2-3 | 4 | 1-2 | 4 | 4 |
| Sulfuric acid, 10% | 0 | 0 | 0 | 0 | 0 | 0 | 0 | 0 | 0 | 0 | 0 | 0 | 0 | 0 | 0 | 0 | 0 | 0 |
| Sodium hydroxide solution, 10% | 0 | 0 | 0 | 0 | 0 | 0 | 0 | 0 | 0 | 0 | 0 | 0 | 0 | 0 | 0 | 0 | 0 | 0 |

Table 8 confirms that the coating compositions according to the invention are characterized not only by good chemical resistance, but also by more rapid drying allied with a longer pot life by comparison with coating compositions based on conventional polyaspartic esters.

The cured coatings 9 to 14 were then subjected to both a condensation water test and a salt spray test.

TABLE 9

Salt spray test and condensation water test on the topcoats from examples 9 to 11 (structure: single layer on steel, blasted to Sa 2 1/2).

| | Example 9 (comparative) | Example 10 (according to the invention) | Example 11 (according to the invention) |
|---|---|---|---|
| Salt spray test: | | | |
| Layer thickness (μm) approx. | 130-150 | 121-141 | 137-140 |
| Baseline value: | Structure, specks 1 | Structure, specks 1 | Structure, specks 1 |
| after 7 d | No change | No change | No change |
| after 14 d | Rust formation on scratch = 1 | Rust formation on scratch = 1 | Rust formation on scratch = 1 |
| after 21 d | Degree of corrosion on scratch in mm = 1 | Degree of corrosion on scratch in mm = 2 | Degree of corrosion on scratch in mm = 1 |
| after 28 d | Degree of corrosion on scratch in mm = 2 | Degree of corrosion on scratch in mm = 2 | Degree of corrosion on scratch in mm = 2 |
| after 35 d | Degree of corrosion on scratch in mm = 2 | Degree of corrosion on scratch in mm = 2 | Degree of corrosion on scratch in mm = 2 |
| after 42 d | Degree of corrosion on scratch in mm = 2 | Degree of corrosion on scratch in mm = 2 | Degree of corrosion on scratch in mm = 2 |
| after 49 d | Degree of corrosion on scratch in mm = 3 | Degree of corrosion on scratch in mm = 3 | Degree of corrosion on scratch in mm = 2 |
| after 56 d | Degree of corrosion on scratch in mm = 3 | Degree of corrosion on scratch in mm = 3 | Degree of corrosion on scratch in mm = 3 |
| after 60 d | Degree of corrosion on scratch in mm = 3 0.1 mm red rust | Degree of corrosion on scratch in mm = 3 0.1 mm red rust | Degree of corrosion on scratch in mm = 3 0.1 mm red rust |
| Adhesion after 84 d + 24 h regeneration | Cross-cut = 2-3 | Cross-cut = 2 | Cross-cut = 1-2 |
| Pull-off | 4.6 N/mm² | 4.3 N/mm² | 4.1 N/mm² |
| Fracture profile: | A/B = 100% | A/B = 100% | A/B = 100% |
| Condensation water test: | | | |
| Layer thickness (μm) approx. | 137-150 | 126-133 | 137-155 |
| Baseline value: | Structure, specks 1 | Structure, specks 1 | Structure, specks 1 |
| after 42 d | No change | No change | No change |

TABLE 10

Salt spray test and condensation water test on the topcoats from examples 12 to 14 (structure: double layer on steel, blasted to Sa 2 1/2).

| | Example 12 (comparative) | Example 13 (according to the invention) | Example 14 (according to the invention) |
|---|---|---|---|
| Salt spray test: | | | |
| Layer thickness (μm) approx. | 96-109/315 | 101-111/319 | 103-113/272-299 |
| Baseline value: | Structure | Structure | Structure |
| after 7 d | No change | No change | No change |
| after 14 d | No change | No change | No change |
| after 21 d | Degree of corrosion on scratch in mm = 1 | Degree of corrosion on scratch in mm = 1 | Degree of corrosion on scratch in mm = 2 |
| after 28 d | Degree of corrosion on scratch in mm = 1 | Degree of corrosion on scratch in mm = 1 | Degree of corrosion on scratch in mm = 2 |
| after 35 d | Degree of corrosion on scratch in mm = 1 | Degree of corrosion on scratch in mm = 2 | Degree of corrosion on scratch in mm = 2 |
| after 42 d | Degree of corrosion on scratch in mm = 1 | Degree of corrosion on scratch in mm = 2 | Degree of corrosion on scratch in mm = 2 |
| after 49 d | Degree of corrosion on scratch in mm = 2 | Degree of corrosion on scratch in mm = 2 | Degree of corrosion on scratch in mm = 3 |
| after 56 d | Degree of corrosion on scratch in mm = 2 | Degree of corrosion on scratch in mm = 3 | Degree of corrosion on scratch in mm = 3 |
| after 60 d | Degree of corrosion on scratch in mm = 3 | Degree of corrosion on scratch in mm = 3 | Degree of corrosion on scratch in mm = 3 0.1 mm red rust |
| Adhesion after 84 d + 24 h regeneration | Cross-cut = 0 | Cross-cut = 0 | Cross-cut = 0 |
| Pull-off | 7.2 N/mm² | 6.7 N/mm² | 7.4 N/mm² |
| Fracture profile: | Y = 5%, A/B = 10%, B = 75% | Y = 10%, B = 90% | Y = 20%, B = 80% |
| Condensation water test: | | | |
| Layer thickness (μm) approx. | 96-107/255-296 | 102-106/305-323 | 96-113/270-280 |
| Baseline value: | Structure | Structure, specks 1 | Structure, specks 1 |
| after 42 d | No change | No change | No change |

These results show that the coating compositions according to the invention contribute to obtaining resistant anticorrosion formulations.

The cured coatings 9 to 14 were then exposed to weathering.

TABLE 11

UV-A and UV-B test on the coatings from examples 9 to 11.

| UV-A | Start | | 500 h | | 750 h | | Delta E | 1000 h | | Delta E |
|---|---|---|---|---|---|---|---|---|---|---|
| Gloss | 20° | 60° | 20° | 60° | 20° | 60° | | 20° | 60° | |
| Example 9 | 38 | 82 | 25 | 73 | 28 | 75 | 0.4 | 27 | 75 | 0.5 |

TABLE 11-continued

| | | | | | | | | | | |
|---|---|---|---|---|---|---|---|---|---|---|
| Example 10 | 45 | 87 | 30 | 78 | 27 | 75 | 0.4 | 26 | 74 | 0.5 |
| Example 11 | 47 | 86 | 28 | 75 | 29 | 77 | 0.4 | 28 | 76 | 0.5 |

| UV-A | 1250 h | | 1500 h | | 1750 h | | Delta E | 2000 h | | Delta E |
|---|---|---|---|---|---|---|---|---|---|---|
| Gloss | 20° | 60° | 20° | 60° | 20° | 60° | | 20° | 60° | |
| Example 9 | 25 | 73 | 25 | 73 | 25 | 73 | 0.9 | 24 | 72 | 0.9 |
| Example 10 | 26 | 74 | 25 | 72 | 25 | 72 | 0.9 | 25 | 72 | 0.9 |
| Example 11 | 26 | 74 | 27 | 74 | 26 | 74 | 0.9 | 25 | 73 | 0.9 |

| UV-B | Start | | 500 h | | 750 h | | Delta E | 1000 h | | Delta E |
|---|---|---|---|---|---|---|---|---|---|---|
| Gloss | 20° | 60° | 20° | 60° | 20° | 60° | | 20° | 60° | |
| Example 9 | 43 | 84 | 21 | 66 | 23 | 70 | 0.8 | 24 | 73 | 0.8 |
| Example 10 | 48 | 82 | 26 | 76 | 26 | 75 | 0.8 | 22 | 72 | 0.8 |
| Example 11 | 42 | 87 | 23 | 73 | 26 | 71 | 0.8 | 24 | 71 | 0.8 |

| UV-B | 1250 h | | 1500 h | | 1750 h | | Delta E | 2000 h | | Delta E |
|---|---|---|---|---|---|---|---|---|---|---|
| Gloss | 20° | 60° | 20° | 60° | 20° | 60° | | 20° | 60° | |
| Example 9 | 21 | 69 | 17 | 64 | <10 | 53 | 1.5 | <10 | 47 | 1.4 |
| Example 10 | 17 | 64 | 21 | 68 | 23 | 70 | 1.5 | 24 | 71 | 1.4 |
| Example 11 | 18 | 66 | 18 | 58 | 14 | 53 | 1.5 | 11 | 48 | 1.4 |

TABLE 12

UV-A and UV-B test on the coatings from examples 12 to 14.

| UV-A | Start | | 500 h | | 750 h | | Delta E | 1000 h | | Delta E |
|---|---|---|---|---|---|---|---|---|---|---|
| Gloss | 20° | 60° | 20° | 60° | 20° | 60° | | 20° | 60° | |
| Example 12 | 49 | 88 | 21 | 69 | 24 | 72 | 0.7 | 21 | 69 | 0.8 |
| Example 13 | 59 | 91 | 26 | 76 | 27 | 72 | 0.8 | 23 | 71 | 0.8 |
| Example 14 | 58 | 90 | 26 | 73 | 28 | 75 | 0.7 | 21 | 68 | 0.8 |

| UV-A | 1250 h | | 1500 h | | 1750 h | | Delta E | 2000 h | | Delta E |
|---|---|---|---|---|---|---|---|---|---|---|
| Gloss | 20° | 60° | 20° | 60° | 20° | 60° | | 20° | 60° | |
| Example 12 | 19 | 67 | 14 | 58 | 11 | 53 | 0.7 | <10 | 43 | 1.0 |
| Example 13 | 22 | 72 | 16 | 63 | 13 | 56 | 0.8 | <10 | 54 | 1.1 |
| Example 14 | 19 | 67 | 16 | 61 | 11 | 56 | 0.7 | <10 | 49 | 1.0 |

| UV-B | Start | | 500 h | | 750 h | | Delta E | 1000 h | | Delta E |
|---|---|---|---|---|---|---|---|---|---|---|
| Gloss | 20° | 60° | 20° | 60° | 20° | 60° | | 20° | 60° | |
| Example 12 | 58 | 90 | 17 | 64 | 16 | 61 | 0.8 | 21 | 69 | 0.9 |
| Example 13 | 57 | 89 | 19 | 67 | 18 | 63 | 0.9 | 23 | 71 | 0.7 |
| Example 14 | 57 | 87 | 18 | 64 | 18 | 63 | 0.8 | 21 | 68 | 0.8 |

| UV-B | 1250 h | | 1500 h | | 1750 h | | Delta E | 2000 h | | Delta E |
|---|---|---|---|---|---|---|---|---|---|---|
| Gloss | 20° | 60° | 20° | 60° | 20° | 60° | | 20° | 60° | |
| Example 12 | 17 | 62 | 20 | 66 | 18 | 63 | 1.2 | 21 | 68 | 1.5 |
| Example 13 | 21 | 68 | 22 | 68 | 21 | 67 | 1.0 | 24 | 70 | 1.4 |
| Example 14 | 20 | 66 | 22 | 69 | 20 | 65 | 1.2 | 25 | 70 | 1.7 |

The topcoats 2 based on coating compositions according to the invention are likewise characterized by a slower loss of gloss and higher or at least equally high residual gloss by comparison with the topcoats 2 based on conventional polyaspartic esters.

The invention claimed is:

1. A two-component coating composition comprising
   a) at least one polyaspartic ester-containing component A;
   b) at least one polyisocyanate component B;
   c) optionally one or more components C that are different from A and are reactive towards isocyanate groups;
   d) at least one inorganic and/or organic pigment (component D1); and
   optionally other auxiliaries and additives (component D2), wherein component A comprises
   one or more polyaspartic esters of the general formula (I)

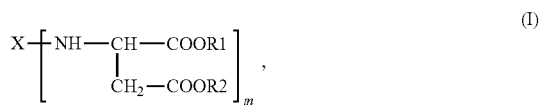

in which
   X is an m-valent organic radical, optionally containing one or more heteroatoms, as can be obtained by removing the primary amino groups from a corresponding polyamine that has (cyclo) aliphatically or araliphatically attached amino groups and is in a molecular weight range from 60 to 6000 g/mol, and which may contain further functional groups that are reactive towards isocyanate groups and/or inert at temperatures of up to 100° C.,
   R1 and R2 are identical or different organic radicals each having 1 to 18 carbon atoms,
   m is an integer>1,
and one or more polyaspartic esters having a primary amino group that are of the general formula (II)

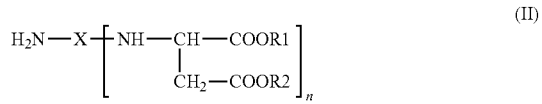

in which
   n is m−1,
   X and radicals R1 and R2 have the meanings defined above,
wherein the proportion of compound(s) of the formula (II) in component A is 4 to 20% of a total area measured as area % in the gas chromatogram (GC), wherein the total area corresponds to a sum of the areas in the GC of compounds of the two general formulas (I) and (II) and is equal to 100%.

2. The two-component coating composition according to claim 1, wherein dialkyl fumarates are present in component A in an amount from 0.01% to 1.2% by weight based on the total weight of component A.

3. The two-component coating composition according to claim 1, wherein the proportion of compound(s) of the formula (II) is 4%-15% of the total area in the GC.

4. The two-component coating composition according to claim 1, wherein dialkyl fumarates are present in component A in an amount from 0.01% to 1.0% by weight based on the total weight of component A.

5. The two-component coating composition according to claim 1, wherein dialkyl fumarates are present in component A in an amount from 0.01% to 0.1% by weight based on the total weight of component A.

6. A process for producing a coating on a substrate comprising:
   i) applying a two-component coating composition according claim 1 to at least part of a substrate to be coated; and
   ii) curing the coating composition from step i).

7. A substrate coated with a coating obtained in accordance with the process according to claim 6.

8. A substrate coated with a coating according to claim 7, wherein the coating is a topcoat.

9. The process for producing a coating on a substrate according to claim 6, wherein the coating is a topcoat.

10. A method of providing corrosion protection to a substrate, comprising applying the two component coating composition according to claim 1 to at least a portion of the substrate.

11. The method of claim 10, wherein the substrate comprises a substrate of ACE (agriculture, construction and earth-moving) equipment.

12. A method of producing a gloss-stable coating, comprising applying the two component coating composition according to claim 1 to at least a portion of a substrate.

* * * * *